US008929961B2

(12) United States Patent
Norair et al.

(10) Patent No.: US 8,929,961 B2
(45) Date of Patent: Jan. 6, 2015

(54) PROTECTIVE CASE FOR ADDING WIRELESS FUNCTIONALITY TO A HANDHELD ELECTRONIC DEVICE

(75) Inventors: John Peter Norair, San Francisco, CA (US); Patrick Burns, San Mateo, CA (US)

(73) Assignee: Blackbird Technology Holdings, Inc., Dover, DE (US)

( * ) Notice: Subject to any disclaimer, the term of this patent is extended or adjusted under 35 U.S.C. 154(b) by 181 days.

(21) Appl. No.: 13/549,102

(22) Filed: Jul. 13, 2012

(65) Prior Publication Data

US 2013/0017788 A1     Jan. 17, 2013

Related U.S. Application Data

(60) Provisional application No. 61/572,390, filed on Jul. 15, 2011.

(51) Int. Cl.
H04M 1/00     (2006.01)
H04M 1/725    (2006.01)
H04M 1/02     (2006.01)

(52) U.S. Cl.
CPC ........ *H04M 1/7253* (2013.01); *H04M 2250/02* (2013.01); *H04M 1/0254* (2013.01); *H04M 1/72575* (2013.01)
USPC .................... 455/575.8; 455/575.1; 455/90.3; 379/330

(58) Field of Classification Search
CPC ......... H04W 4/16; H04W 4/18; H04W 76/02; H04W 4/14; H04W 4/12; H04W 76/007
USPC .......... 455/575.8, 575.1, 90.3, 41.2; 379/330, 379/428.01, 447
See application file for complete search history.

(56) References Cited

U.S. PATENT DOCUMENTS

| 5,338,625 | A |   | 8/1994 | Bates |
| 5,517,683 | A | * | 5/1996 | Collett et al. .............. 455/575.1 |
| 5,615,366 | A |   | 3/1997 | Hansen |
| 5,729,557 | A |   | 3/1998 | Gardner et al. |
| 5,959,281 | A |   | 9/1999 | Domiteaux |
| 6,108,716 | A | * | 8/2000 | Kimura et al. .................... 710/1 |
| 6,115,379 | A |   | 9/2000 | Flanders et al. |

(Continued)

FOREIGN PATENT DOCUMENTS

| EP | 1321009 B1 | 1/2007 |
| JP | 2009/010449 A | 1/2009 |
| WO | 2006001556 A1 | 1/2006 |
| WO | 2009023592 A2 | 2/2009 |

OTHER PUBLICATIONS

PCT Int'l Searching Authority, Notification Concerning Transmittal of the Int'l Search Report and the Written Opinion of the Int'l Searching authority or the Declaration in Int'l application No. PCT/US2012/027386 dated Oct. 16, 2012.

(Continued)

*Primary Examiner* — Minh D Dao
(74) *Attorney, Agent, or Firm* — McAndrews, Held & Malloy, Ltd.

(57) ABSTRACT

A protective case for an electronic device may comprise a wireless adaptor for adding wireless capabilities, including support of additional wireless communication protocols, to the electronic device. The system may enable, for example, location based services functions, social networking functions, and messaging functions.

12 Claims, 8 Drawing Sheets

(56) References Cited

U.S. PATENT DOCUMENTS

| | | |
|---|---|---|
| 6,307,846 B1 | 10/2001 | Willey |
| 6,330,700 B1 | 12/2001 | Morris |
| 6,356,442 B1 | 3/2002 | Lunsford |
| 6,381,243 B1 | 4/2002 | Ekstedt |
| 6,388,997 B1 | 5/2002 | Scott |
| 6,424,301 B1 | 7/2002 | Johnson |
| 6,452,569 B1 | 9/2002 | Park |
| 6,525,928 B1 | 2/2003 | Madsen |
| 6,665,308 B1 | 12/2003 | Rakib |
| 6,700,491 B2 | 3/2004 | Shafer |
| 6,705,531 B1 | 3/2004 | Norton |
| 6,714,559 B1 | 3/2004 | Meier |
| 6,771,985 B1 | 8/2004 | Iinuma |
| 7,009,941 B1 | 3/2006 | Uchino |
| 7,072,431 B2 | 7/2006 | Wang |
| 7,233,603 B2 | 6/2007 | Lee |
| 7,280,555 B2 | 10/2007 | Stanforth |
| 7,292,548 B2 | 11/2007 | Lim et al. |
| 7,293,088 B2 | 11/2007 | Douglas |
| 7,305,237 B2 | 12/2007 | Stephens |
| 7,308,103 B2 | 12/2007 | Corcoran et al. |
| 7,315,248 B2 | 1/2008 | Egbert |
| 7,330,446 B2 | 2/2008 | Lee |
| 7,369,512 B1 | 5/2008 | Shurbanov et al. |
| 7,554,981 B2 | 6/2009 | Kecskemeti |
| 7,580,397 B2 | 8/2009 | Arai et al. |
| 7,606,256 B2 | 10/2009 | Vitebsky |
| 7,643,509 B2 | 1/2010 | Han et al. |
| 7,663,878 B2 | 2/2010 | Swan |
| 7,672,284 B2 | 3/2010 | Sugar et al. |
| 7,689,195 B2 | 3/2010 | Wu |
| 7,698,463 B2 | 4/2010 | Ogier et al. |
| 7,735,116 B1 | 6/2010 | Gauvin |
| 7,760,689 B2 | 7/2010 | Shin |
| 7,777,689 B2 * | 8/2010 | Fratti et al. .................... 343/895 |
| 7,805,129 B1 | 9/2010 | Issa |
| 7,814,107 B1 | 10/2010 | Thirumalai et al. |
| 7,890,839 B2 | 2/2011 | Iwami |
| 7,941,197 B2 * | 5/2011 | Jain et al. .................... 455/575.8 |
| 7,962,361 B2 | 6/2011 | Ramchandani |
| 8,029,300 B2 * | 10/2011 | Finney et al. ................. 439/136 |
| 8,035,488 B2 | 10/2011 | Shiotsu et al. |
| 8,036,715 B2 | 10/2011 | Buck |
| 8,060,155 B2 * | 11/2011 | Park et al. .................... 455/575.1 |
| 8,190,221 B2 * | 5/2012 | Jain et al. .................... 455/575.8 |
| 8,325,665 B2 | 12/2012 | Kim |
| 8,351,409 B2 | 1/2013 | Albert |
| 8,380,259 B2 * | 2/2013 | Jain et al. .................... 455/575.1 |
| 8,483,196 B2 | 7/2013 | Wang |
| 8,548,540 B2 * | 10/2013 | Jain et al. .................... 455/575.8 |
| 8,554,271 B2 | 10/2013 | Wang et al. |
| 8,599,687 B1 | 12/2013 | Kleyman |
| 8,718,551 B2 | 5/2014 | Norair |
| 8,774,096 B2 | 7/2014 | Norair |
| 2002/0025823 A1 | 2/2002 | Hara |
| 2002/0078045 A1 | 6/2002 | Dutta |
| 2002/0108045 A1 | 8/2002 | Wells |
| 2003/0115369 A1 | 6/2003 | Walter |
| 2003/0128674 A1 | 7/2003 | Kong |
| 2003/0154243 A1 | 8/2003 | Crockett |
| 2003/0183691 A1 | 10/2003 | Lahteenmaki |
| 2004/0157631 A1 | 8/2004 | Stobart |
| 2004/0218557 A1 | 11/2004 | Kim et al. |
| 2005/0078038 A1 | 4/2005 | Takaki |
| 2005/0083943 A1 | 4/2005 | Lee et al. |
| 2005/0128086 A1 | 6/2005 | Brown |
| 2005/0135291 A1 | 6/2005 | Ketchum et al. |
| 2005/0138178 A1 | 6/2005 | Astarabadi |
| 2005/0139685 A1 | 6/2005 | Kozlay |
| 2005/0174953 A1 | 8/2005 | Ho |
| 2006/0002312 A1 | 1/2006 | Delattre et al. |
| 2006/0088021 A1 | 4/2006 | Nelson et al. |
| 2006/0091223 A1 | 5/2006 | Zellner |
| 2006/0145817 A1 | 7/2006 | Aikawa |
| 2006/0165024 A1 | 7/2006 | Iwami |
| 2006/0175420 A1 | 8/2006 | Satou |
| 2006/0184860 A1 | 8/2006 | Takagi |
| 2006/0205343 A1 | 9/2006 | Runyon |
| 2006/0219776 A1 | 10/2006 | Finn |
| 2006/0220867 A1 | 10/2006 | Dixon |
| 2007/0000316 A1 | 1/2007 | Lauer |
| 2007/0002892 A1 | 1/2007 | Waxman |
| 2007/0010928 A1 | 1/2007 | Brusarosco |
| 2007/0026891 A1 | 2/2007 | Lai |
| 2007/0058661 A1 | 3/2007 | Chow |
| 2007/0083697 A1 | 4/2007 | Birrell |
| 2007/0083924 A1 | 4/2007 | Lu |
| 2007/0099641 A1 | 5/2007 | Lastinger |
| 2007/0113636 A1 | 5/2007 | Huang |
| 2007/0125836 A1 | 6/2007 | McAllister et al. |
| 2007/0136509 A1 | 6/2007 | Agami |
| 2007/0173197 A1 * | 7/2007 | Hsiung ..................... 455/3.06 |
| 2007/0183366 A1 | 8/2007 | Park |
| 2007/0232281 A1 | 10/2007 | Nakai |
| 2007/0254619 A1 | 11/2007 | Salomone |
| 2007/0295074 A1 | 12/2007 | Kobayakawa |
| 2008/0041936 A1 | 2/2008 | Vawter |
| 2008/0069097 A1 | 3/2008 | Motegi |
| 2008/0075123 A1 | 3/2008 | Fourcand |
| 2008/0107060 A1 | 5/2008 | Andou et al. |
| 2008/0123683 A1 | 5/2008 | Cheng |
| 2008/0130597 A1 | 6/2008 | Kalhan |
| 2008/0164325 A1 | 7/2008 | Borracci |
| 2008/0172357 A1 | 7/2008 | Rechis |
| 2008/0186857 A1 | 8/2008 | Becker |
| 2008/0186867 A1 | 8/2008 | Schoo et al. |
| 2008/0209322 A1 | 8/2008 | Kaufman |
| 2008/0219323 A1 | 9/2008 | Desai |
| 2008/0228592 A1 | 9/2008 | Kotas |
| 2008/0238621 A1 | 10/2008 | Rofougaran |
| 2008/0242279 A1 | 10/2008 | Ramer |
| 2008/0256409 A1 | 10/2008 | Oran et al. |
| 2008/0279210 A1 | 11/2008 | Naka |
| 2008/0302177 A1 | 12/2008 | Sinnett |
| 2008/0320139 A1 | 12/2008 | Fukuda |
| 2009/0003376 A1 | 1/2009 | Horvat |
| 2009/0006376 A1 | 1/2009 | Hendriks |
| 2009/0034491 A1 | 2/2009 | Adams |
| 2009/0055377 A1 | 2/2009 | Hedge |
| 2009/0069049 A1 | 3/2009 | Jain |
| 2009/0073070 A1 | 3/2009 | Rofougaran |
| 2009/0094501 A1 | 4/2009 | Jijina |
| 2009/0113267 A1 | 4/2009 | Harrison |
| 2009/0138948 A1 | 5/2009 | Calamera |
| 2009/0141531 A1 | 6/2009 | Abedin |
| 2009/0150646 A1 | 6/2009 | Allen |
| 2009/0171749 A1 | 7/2009 | Laruelle |
| 2009/0171947 A1 | 7/2009 | Karayel |
| 2009/0196279 A1 | 8/2009 | Kim |
| 2009/0210898 A1 | 8/2009 | Childress et al. |
| 2009/0251295 A1 | 10/2009 | Norair |
| 2009/0268674 A1 | 10/2009 | Liu |
| 2009/0279652 A1 | 11/2009 | Sinha |
| 2009/0286496 A1 | 11/2009 | Yavuz et al. |
| 2009/0292418 A1 | 11/2009 | Kuykendal |
| 2010/0011156 A1 | 1/2010 | Yim |
| 2010/0026589 A1 | 2/2010 | Dou |
| 2010/0027558 A1 | 2/2010 | Han |
| 2010/0036806 A1 | 2/2010 | Lam |
| 2010/0052859 A1 | 3/2010 | Lossau |
| 2010/0075612 A1 | 3/2010 | Oi |
| 2010/0078471 A1 | 4/2010 | Lin |
| 2010/0097946 A1 | 4/2010 | Celentano |
| 2010/0097956 A1 | 4/2010 | Tauil |
| 2010/0097957 A1 | 4/2010 | Pirzada et al. |
| 2010/0118737 A1 | 5/2010 | Kim |
| 2010/0162069 A1 | 6/2010 | Niu |
| 2010/0177696 A1 | 7/2010 | Jung |
| 2010/0179877 A1 | 7/2010 | Lam |
| 2010/0181377 A1 | 7/2010 | Chen |
| 2010/0190437 A1 | 7/2010 | Buhot |
| 2010/0197261 A1 | 8/2010 | Zibrik et al. |
| 2010/0228617 A1 | 9/2010 | Ransom et al. |
| 2010/0232408 A1 | 9/2010 | Lim |

(56) References Cited

U.S. PATENT DOCUMENTS

| | | |
|---|---|---|
| 2010/0256976 A1 | 10/2010 | Atsmon |
| 2010/0261496 A1 | 10/2010 | Fukumoto |
| 2010/0280904 A1 | 11/2010 | Ahuja |
| 2010/0295681 A1 | 11/2010 | Burns et al. |
| 2010/0298029 A1* | 11/2010 | Jang .............................. 455/557 |
| 2010/0303051 A1 | 12/2010 | Umeuchi et al. |
| 2011/0003607 A1 | 1/2011 | Forenza et al. |
| 2011/0007733 A1 | 1/2011 | Kubler et al. |
| 2011/0029370 A1 | 2/2011 | Roeding |
| 2011/0064013 A1 | 3/2011 | Liu et al. |
| 2011/0074552 A1 | 3/2011 | Norair |
| 2011/0099037 A1 | 4/2011 | Levin |
| 2011/0111766 A1 | 5/2011 | Yang |
| 2011/0112892 A1 | 5/2011 | Tarantino |
| 2011/0116513 A1 | 5/2011 | Gilson |
| 2011/0156872 A1 | 6/2011 | Wengrovitz |
| 2011/0191657 A1 | 8/2011 | Bliss |
| 2011/0268024 A1 | 11/2011 | Jamp |
| 2011/0316716 A1 | 12/2011 | Mackay |
| 2012/0001730 A1 | 1/2012 | Potyrailo |
| 2012/0052929 A1* | 3/2012 | Thammasouk et al. ... 455/575.1 |
| 2012/0059936 A1 | 3/2012 | Bauchot |
| 2012/0086615 A1 | 4/2012 | Norair |
| 2012/0087267 A1 | 4/2012 | Norair |
| 2012/0087350 A1 | 4/2012 | Norair |
| 2012/0088449 A1 | 4/2012 | Norair |
| 2012/0093151 A1 | 4/2012 | McFarland et al. |
| 2012/0116694 A1 | 5/2012 | Norair |
| 2012/0116887 A1 | 5/2012 | Norair |
| 2012/0118952 A1 | 5/2012 | Norair |
| 2012/0191848 A1 | 7/2012 | Norair |
| 2012/0191901 A1 | 7/2012 | Norair |
| 2012/0201246 A1 | 8/2012 | Fernandez Gutierrez |
| 2012/0207141 A1 | 8/2012 | Norair |
| 2012/0209716 A1 | 8/2012 | Burns |
| 2012/0224491 A1 | 9/2012 | Norair |
| 2012/0224530 A1 | 9/2012 | Norair |
| 2012/0224543 A1 | 9/2012 | Norair |
| 2012/0224590 A1 | 9/2012 | Norair |
| 2012/0225687 A1 | 9/2012 | Norair |
| 2012/0226822 A1 | 9/2012 | Norair |
| 2012/0226955 A1 | 9/2012 | Norair |
| 2013/0203473 A1* | 8/2013 | Kota .......................... 455/575.8 |
| 2013/0210461 A1 | 8/2013 | Moldavsky et al. |
| 2013/0231049 A1* | 9/2013 | Sharma et al. ............... 455/41.2 |
| 2013/0260835 A1* | 10/2013 | Sikora et al. .................. 455/566 |
| 2014/0024342 A1* | 1/2014 | Jain et al. ....................... 455/411 |

OTHER PUBLICATIONS

PCT International Searching Authority, Notification Concerning Transmittal of the International Search Report and the Written Opinion of the International Searching Authority, or the Declaration, in International application No. PCT/US2011/55118, dated Feb. 28, 2012. (25 pages).
PCT International Searching Authority, Notification Concerning Transmittal of the International Search Report and the Written Opinion of the International Searching Authority, or the Declaration, in International application No. PCT/US11/55082, dated Mar. 1, 2012 (13 pages).
PCT International Searching Authority, Notification Concerning Transmittal of the International Search Report and the Written Opinion of the International Searching Authority, or the Declaration, in International application No. PCT/US11/55934, dated Mar. 6, 2012 (11 pages).
PCT International Searching Authority, Notification Concerning Transmittal of the International Search Report and the Written Opinion of the International Searching Authority, or the Declaration, in International application No. PCT/US2011/055929, dated Jan. 30, 2012. (15 pages).
PCT International Searching Authority, Notification Concerning Transmittal of the International Search Report and the Written Opinion of the International Searching Authority, or the Declaration, in International application No. PCT/US2011/059292, dated Feb. 2, 2012. (12 pages).
PCT International Searching Authority, Notification Concerning Transmittal of the International Search Report and the Written Opinion of the International Searching Authority, or the Declaration, in International application No. PCT/US11/059304, dated Mar. 9, 2012 (11 pages).
PCT International Searching Authority, Notification Concerning Transmittal of the International Search Report and the Written Opinion of the International Searching Authority, or the Declaration, in International application No. PCT/US2011/060950, dated Mar. 16, 2012. (14 pages).
PCT International Searching Authority, Notification Concerning Transmittal of the International Search Report and the Written Opinion of the International Searching Authority, or the Declaration, in International application No. PCT/US12/22005, dated Mar. 29, 2012. (12 pages).
PCT International Searching Authority, Notification Concerning Transmittal of the International Search Report and the Written Opinion of the International Searching Authority, or the Declaration, in International application No. PCT/US12/22002, dated May 8, 2012. (13 pages).
PCT International Searching Authority, Notification Concerning Transmittal of the International Search Report and the Written Opinion of the International Searching Authority, or the Declaration, in International application No. PCT/US2012/025191 dated May 25, 2012 (8 pages).
PCT International Searching Authority, Notification Concerning Transmittal of the International Search Report and the Written Opinion of the International Searching Authority, or the Declaration, in International application No. PCT/US2012/025197 dated May 25, 2012 (7 pages).
PCT International Searching Authority, Notification Concerning Transmittal of the International Search Report and the Written Opinion of the International Searching Authority, or the Declaration, in International application No. PCT/US2012/027382 dated May 31, 2012 (10 pages).
PCT International Searching Authority, Notification Concerning Transmittal of the International Search Report and the Written Opinion of the International Searching Authority, or the Declaration, in International application No. PCT/US2012/027381 dated May 31, 2012 (13 pages).
PCT International Searching Authority, Notification Concerning Transmittal of the International Search Report and the Written Opinion of the International Searching Authority, or the Declaration, in International application No. PCT/US2012/027387 dated Jun. 6, 2012 (14 pages).
PCT International Searching Authority, Notification Concerning Transmittal of the International Search Report and the Written Opinion of the International Searching Authority, or the Declaration, in International application No. PCT/US2012/27378 dated Jun. 13, 2012 (14 pages).
PCT International Searching Authority, Notification Concerning Transmittal of the International Search Report and the Written Opinion of the International Searching Authority, or the Declaration, in International application No. PCT/US2012/027379 dated Jun. 20, 2012 (16 pages).
PCT International Searching Authority, Notification Concerning Transmittal of the International Search Report and the Written Opinion of the International Searching Authority, or the Declaration, in International application No. PCT/US2012/027384 dated Jun. 20, 2012 (10 pages).
Norair JP (2009). Introduction to DASH7 Technologies 1 st Edition. Whitepaper. Mar, 16, 2009. 1-22.
Richard MacManus. DASH7: Bringing Sensor Networking to Smartphones. readwrite.com. Apr. 11, 2010. pp. 1-5.
PCT Int'l Searching Authority, Notification Concerning Transmittal of the Int'l Search Report and The Written Opinion of the Int'l Searching authority or the Declaration in Int'l application No. PCT/US2012/046894 dated Sep. 27, 2012.

* cited by examiner

PROTECTIVE CASE FOR ADDING WIRELESS FUNCTIONALITY TO A HANDHELD ELECTRONIC DEVICE

CLAIM OF PRIORITY

This patent application makes reference to, claims priority to and claims benefit from U.S. Provisional Patent Application Ser. No. 61/572,390 filed on Jul. 15, 2011.

The above application is hereby incorporated herein by reference in its entirety.

INCORPORATION BY REFERENCE

This patent application also makes reference to:
U.S. Provisional Patent Application Ser. No. 61/464,376 titled "Advanced Communication System for Wide-Area Low Power Wireless Applications and Active RFID" and filed on Mar. 2, 2011;
U.S. patent application Ser. No. 13/267,640 titled "Method and Apparatus for Adaptive Searching of Distributed Datasets," filed on Oct. 6, 2011, and now published as United States Patent Application Publication 2012/0087267;
U.S. patent application Ser. No. 13/267,621 titled "Method and Apparatus for Low-Power, Long-Range Networking," filed on Oct. 6, 2011, and now published as United States Patent Application Publication 2012/0087350;
U.S. patent application Ser. No. 13/270,802 titled "Method and Apparatus for a Multi-band, Multi-mode Smartcard," filed on Oct. 11, 2011, and now published as United States Patent Application Publication 2012/008449;
U.S. patent application Ser. No. 13/270,959 titled "Method and Apparatus for an Integrated Antenna," filed on Oct. 11, 2011, and now published as United States Patent Application Publication 2012/0086615;
U.S. patent application Ser. No. 13/289,054 titled "Method and Apparatus for Electronic Payment," filed on Nov. 4, 2011, and now published as United States Patent Application Publication 2012/0116887;
U.S. patent application Ser. No. 13/297,348 titled "Method and Apparatus for Interfacing with a Smartcard," filed on Nov. 16, 2011, and now published as United States Patent Application Publication 2012/0118952;
U.S. patent application Ser. No. 13/354,513 titled "Method and Apparatus for Memory Management" and filed on Jan. 20, 2012;
U.S. patent application Ser. No. 13/354,615 titled "Method and Apparatus for Discovering, People, Products, and/or Services via a Localized Wireless Network" and filed on Jan. 20, 2012;
U.S. patent application Ser. No. 13/396,708 titled "Method and apparatus for Plug and Play, Networkable ISO 18000-7 Connectivity" and filed on Feb. 15, 2012;
U.S. patent application Ser. No. 13/396,739 titled "Method and Apparatus for Serving Advertisements in a Low-Power Wireless Network" and filed on Feb. 15, 2012;
U.S. patent application Ser. No. 13/408,440 titled "Method and Apparatus for Forward Error Correction (FEC) in a Resource-Constrained Network" and filed on Feb. 29, 2012;
U.S. patent application Ser. No. 13/408,447 titled "Method and Apparatus for Adaptive Traffic Management in a Resource-Constrained Network" and filed on Feb. 29, 2012;
U.S. patent application Ser. No. 12/408,453 titled "Method and Apparatus for Dynamic Media Access Control in a Multiple Access System" and filed on Feb. 29, 2012;
U.S. patent application Ser. No. 13/408,457 titled "Method and Apparatus for Rapid Group Synchronization" and filed on Feb. 29, 2012;
U.S. patent application Ser. No. 13/408,461 titled "Method and Apparatus for Addressing in a Resource-Constrained Network" and filed on Feb. 29, 2012;
U.S. patent application Ser. No. 13/408,464 titled "Method and Apparatus for Query-Based Congestion Control" and filed on Feb. 29, 2012; and
U.S. patent application Ser. No. 13/408,466 titled "Method and Apparatus for Power Autoscaling in a Resource-Constrained Network" and filed on Feb. 29, 2012.

Each of the above stated applications is hereby incorporated herein by reference in its entirety.

TECHNICAL FIELD

Aspects of the present application generally relate to wireless communications. More specifically, to a method and apparatus for adding wireless functionality to a handheld electronic device.

BACKGROUND

Wireless adaptors are often cumbersome, inefficient, and lacking in features. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A method and/or apparatus is provided for adding wireless functionality to a handheld electronic device, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "example" means serving as a non-limiting example, instance, or illustration. As utilized herein, the term "e.g.," introduces a list of one or more non-limiting examples, instances, or illustrations.

Figure 1:
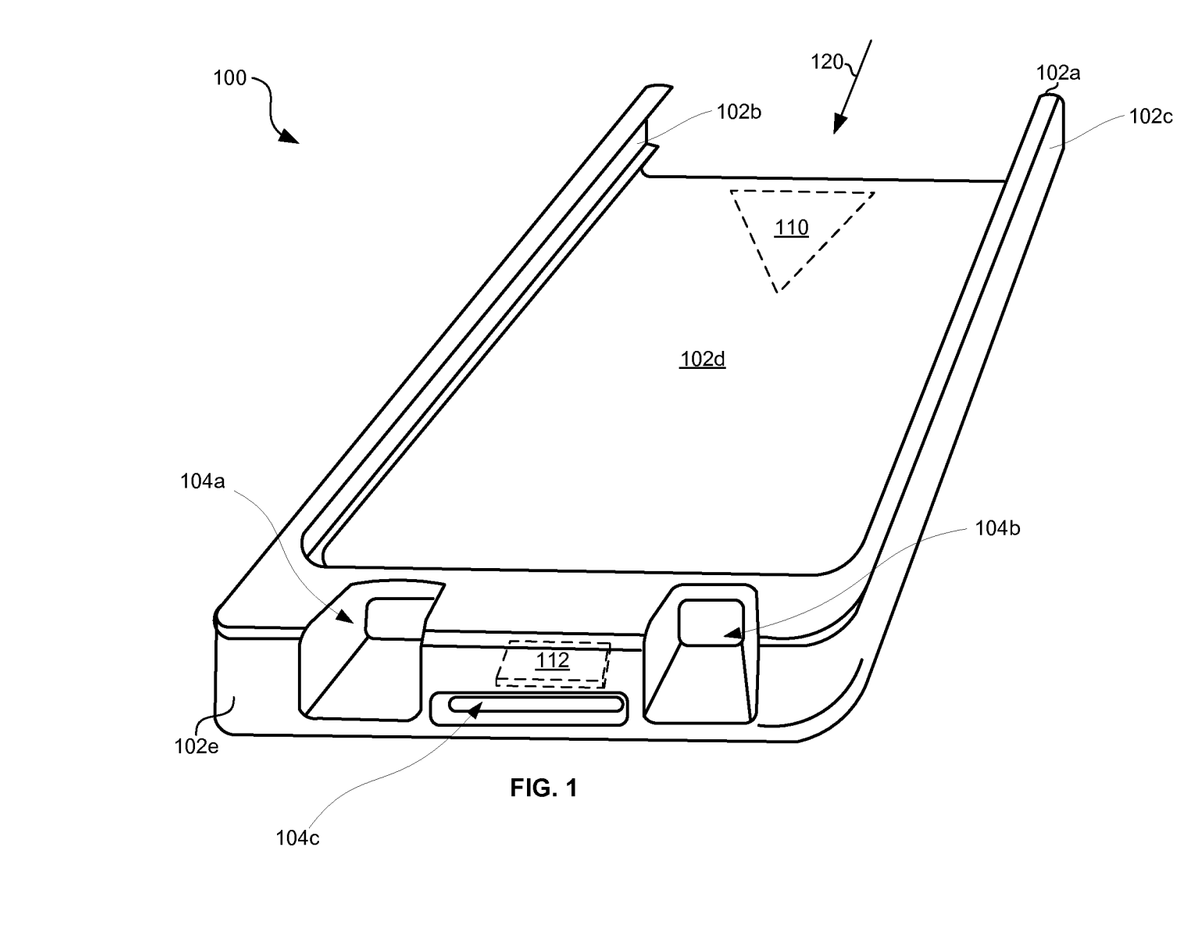
FIG. 1 depicts an example protective case with integrated wireless adaptor for a handheld electronic device.

FIG. 1 depicts an example protective case with integrated wireless adaptor for a handheld electronic device. Referring to FIG. 1, the example case 100 comprises walls 102a-102e to encase a handheld device. The walls 102a-102d of this example implementation are arranged such that a handheld device mounts to the case 100 by sliding in from the top (as indicated by arrow 120) and, once the handheld is mounted, the arrange may be as follows: an inner surface of wall 102a faces a front side (e.g., screen and/or bezel) of the handheld device; an inner surface of the wall 102b faces a right side of the handheld device; an inner surface of the wall 102c faces a left side of the handheld device; an inner surface of the wall 102d faces a back side of the handheld device; and an inner surface of the wall 102e faces the bottom of the handheld device. Thus, the example case 100 substantially encases the mounted handheld device such that: the device is secured in the case 100 and does not inadvertently fall out of the case 100, the device is protected from scratches, and/or the handheld device is protected from damage in the event that it is dropped. The dimensions of the handheld device plus case 100 when the device is mounted may be substantially similar to the dimensions of the handheld device when it is not mounted in the case 100. For example, each of the walls 102a-102d may be on the order of millimeters in thickness and the wall 102e may be on the order of tens of millimeters in thickness.

In the example case 100, the walls 102a-102e may be made of rubber or plastic (or other suitable material). The wall 102a has a cut-out to allow access to a touchscreen of the mounted handheld device. The wall 102d has an antenna 110 embedded in it. The wall 102e has cutouts 104a and 104b to enable access to features (e.g., speakers) of the handheld device, has a cutout 104c to enable connection (e.g., via a USB cable) to a device (e.g., a laptop or desktop computer) that is not mounted in the case 100, and has a module 112 embedded in it (and is thus thicker than walls 102a-102d to accommodate the module 112).

Figure 2:
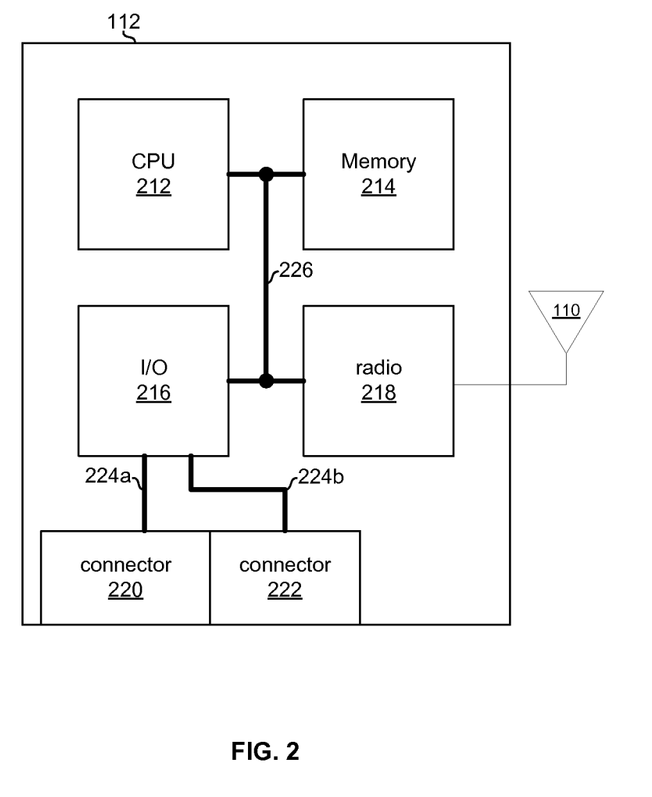
FIG. 2 depicts an example module of the protective case shown in FIG. 1.

FIG. 2 depicts an example module of the case shown in FIG. 1. The example module 112 may function as a wireless adaptor and comprises a CPU 212, memory 214, input/output (I/O) module 216, radio module 218, connector 220, and connector 222.

The CPU 212 may be operable to control operation of the wireless case 100. The CPU 212 may, for example, execute an operating system, and/or other programs (e.g., programs that implement one or more layers of a network protocol stack) to, for example, process data, manage transfers of data, and/or control operation of the various modules of the case 100.

The memory module 214 may comprise, for example, RAM, configuration registers, and/or mass storage (e.g., a hard drive and/or flash memory). The memory module 210 may comprise program memory that may store code to be executed by the CPU 212, run-time data that may be generated as a result of the CPU 212 executing code, parameters which configure one or more of the modules of the case 100, and/or data received via the busses 224a and 224b. The case 100 may support a mode of operation in which a device to which the case 100 is mounted can use memory 214 as a mass storage device (e.g., a USB mass storage device).

The I/O module 216 may be operable to manage or facilitate transfers over and/or among data busses 226, 224a and 224b. In an example implementation, I/O module 216 may perform packet-based switching or routing among data busses 226, 224, and 224b. In an example implementation, protocols used on the busses 226, 224a, and 224b may comprise, for example, one or more of USB, IEEE 1394, Ethernet, PCMCIA, PCI-X, and/or any other suitable protocol(s). In an example implementation, the I/O module 216 may operate as a passthrough such that the connector 222 is (or appears to devices connected to connector 222 and connector 220 as if it is) directly connected (i.e. "wired") to the connector 220. In an example implementation, the I/O module 216 may operate a selective passthrough such that sometimes, and/or for some devices, the connector 220 and connector 222 are (or appear to be) wired together and sometimes, and/or for some devices, are not (or appear not to be) wired together.

For transmission, the radio 218 may be operable to receive data via the bus 226, packetize the data, encode the data, convert the data to analog, modulate the data onto one or more carriers, and/or otherwise process the data to prepare it for transmission via antenna 110 in accordance with one or more wireless protocols. For reception, the radio 218 may be operable to receive data RF signals via antenna 110, downconvert, demodulate, decode, convert to digital, and/or otherwise process the received signals to recover data contained therein, and make the data available to the bus 226. In an example implementation, the radio 218 may support one or more wireless communication protocols not supported by a handheld device with which the case 100 is designed to interface. Example wireless communication protocols which may be supported by the radio 218 include the ISO 18000-7 standard, and protocols described in U.S. patent application Ser. No. 13/267,640 ("Method and Apparatus for Adaptive Searching of Distributed Datasets") and Ser. No. 13/267,621 ("Method and Apparatus for Low-Power, Long-Range Networking"), which are incorporated herein by reference as set forth above.

The antenna 110 may be operable to transmit and receive electromagnetic signals in one or more frequency bands. In an embodiment of the invention, the antenna 110 may be operable to transmit and receive signals in the ISM frequency band centered at 433.92 MHz.

The connector 220 may enable electrical connection of the case 100 to a handheld electronic device 300 mounted in the case 100. The connector 220 may comprise pins suitable for carrying the protocol(s) utilized on the bus 224a. In an example implementation, the connector 220 may be a male connector.

The connector 222 may enable electrical connection of an electronic device (e.g., a computer) to the case 100 while a handheld device is mounted in the case 100 and/or to the handheld electronic device mounted in the case 100. The connector 222 may comprise pins suitable for carrying the protocol(s) utilized on the bus 224b which may comprise, for example, USB, IEEE 1394, Ethernet, and/or any other suitable protocol. In an example implementation, the connector 222 may be a female connector.

Figure 3:
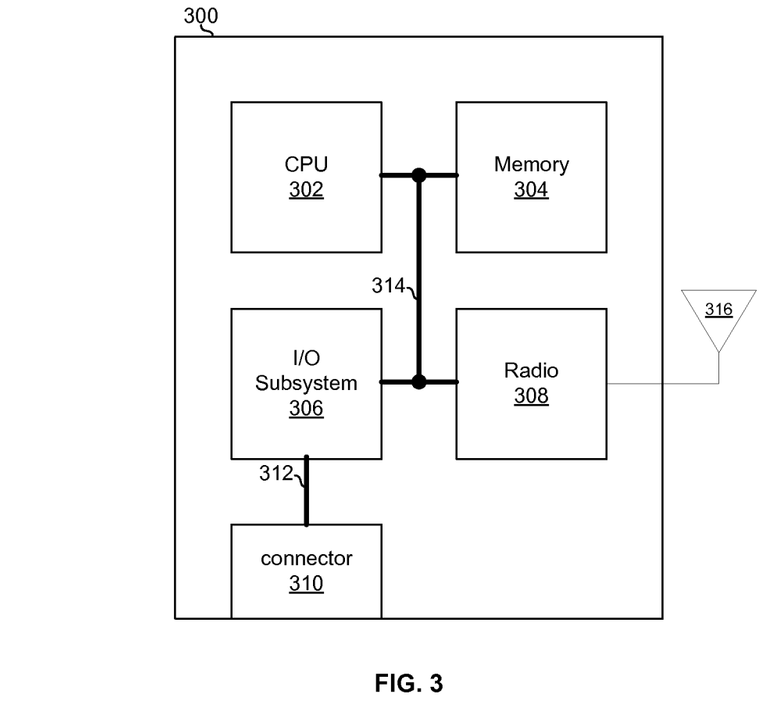
FIG. 3 depicts an example handheld electronic device that is operable to interface with the case described with reference to FIGS. 1 and 2.

FIG. 3 depicts an example handheld electronic device that is operable to interface with the case with integrated wireless adaptor described with reference to FIGS. 1 and 2. The example device 300 comprises a CPU 312, a memory 304, an I/O module 306, a radio 308, and a connector 310. The handheld device 300 may be, for example, a tablet computer or smartphone.

The CPU 302 may be operable to control operation of the handheld wireless device 300. The CPU 302 may, for example, execute an operating system, and/or other programs (e.g., programs that implement one or more layers of a network protocol stack) to, for example, process data, manage transfers of data, and/or control operation of the various modules of the handheld device 300.

The memory module 304 may comprise, for example, RAM, configuration registers, and/or mass storage (e.g., a hard drive and/or flash memory). The memory module 304 may be comprise program memory that may store code to be executed by the CPU 302, run-time data that may be generated as a result of the CPU 212 executing code, parameters which configure one or more of the modules of the case 100, and/or data received via the bus 312.

The I/O module 306 may be operable to manage or facilitate transfers over and/or between data busses 312 and 314. In an example implementation, protocols used on the busses 314 and 314 may comprise, for example, one or more of USB, IEEE 1394, Ethernet, PCMCIA, PCI-X, and/or any other suitable protocol(s).

For transmission, the radio 308 may be operable to receive data via the bus 226, packetize the data, encode the data, convert the data to analog, modulate the data onto one or more carriers, and/or otherwise process the data to prepare it for transmission via antenna 316 in accordance with one or more wireless protocols. For reception, the radio 308 may be operable to receive data RF signals via antenna 316, downconvert, demodulate, decode, convert to digital, and/or otherwise process the received signals to recover data contained therein, and make the data available to the bus 314. In an example implementation, the radio 308 may support, cellular protocols, Wi-Fi, WiMAX, Bluetooth, and/or other wireless communication protocols but may not support one or more wireless communication protocols supported by the case 100. Example wireless communication protocols which may be supported by the radio 218 include the ISO 18000-7 standard, and protocols described in U.S. patent application Ser. No. 13/267,640 ("Method and Apparatus for Adaptive Searching of Distributed Datasets") and Ser. No. 13/267,621 ("Method and Apparatus for Low-Power, Long-Range Networking"), which are incorporated by reference above.

The antenna 316 may be operable to transmit and receive electromagnetic signals in one or more frequency bands. In an embodiment of the invention, the antenna 316 may be operable to transmit and receive signals in frequency bands utilized by cellular, Wi-Fi, and/or Bluetooth protocols.

The connector 310 may enable electrical connection of the handheld device 300 to other devices. The connector 310 may comprise pins suitable for carrying the protocol(s) utilized on the bus 312. In an example implementation, the connector 310 may be a female connector.

Figure 4:
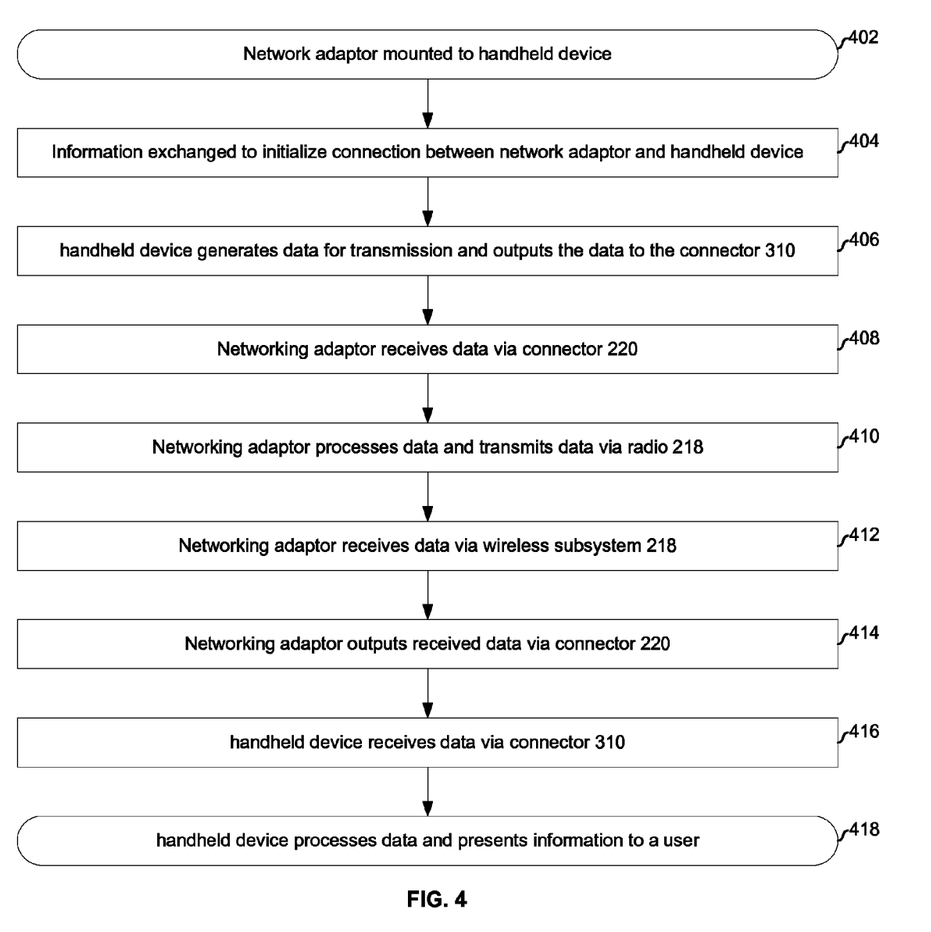
FIG. 4 is a flowchart illustrating communication by a system comprising a smartphone and a protective case with integrated wireless adaptor.

FIG. 4 is a flowchart illustrating communication by a system comprising a smartphone and a protective case with integrated wireless adaptor. The example steps begin with step 402 in which the case 100 is mounted to the handheld device 300. In step 404, information is exchanged, via bus 224a, connector 220, connector 310, and bus 312, between the case 100 and the device 300 to establish a connection between the device 300 and case 100. In step 406, the device 300 generates data to be transmitted and outputs the data to the connector 300. In step 408, the case 100 receives, via connector 220, the data generated in step 406. In step 410, the case 100 processes the data (e.g., based on commands received along with the data) and transmits the data via the radio.

In step 412, the case may receive data via the radio 218. The data may be, for example, a response to the data transmitted in step 410. In this regard, the communications via the radio 218 may be part of an adaptive search as described in U.S. patent application Ser. No. 13/267,640, which is incorporated by reference above. In step 414, the case 100 may output the data to the connector 220. In step 416, the device 300 may receive the received data via connector 310. In step 418, the device 300 may process the data and present it, and/or related information to a user.

Figure 5:
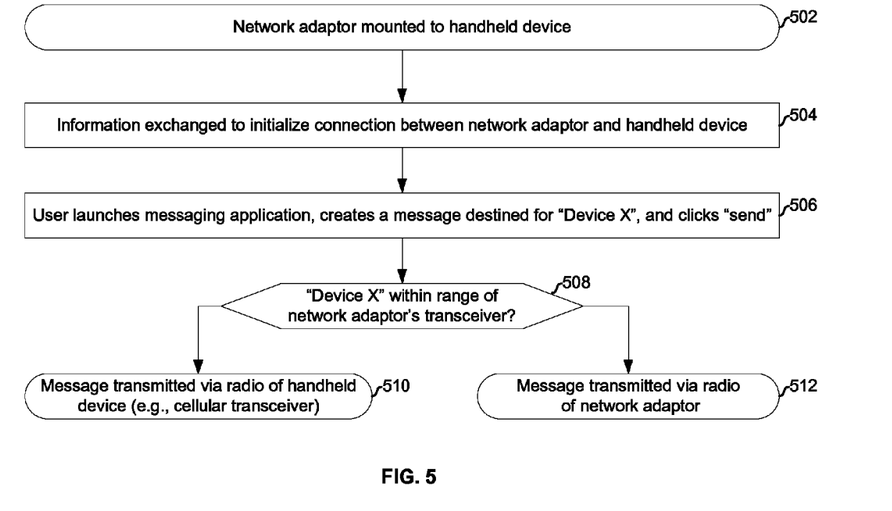
FIG. 5 is a flowchart illustrating messaging operations performed by a system comprising a smartphone and a protective case with integrated wireless adaptor.

FIG. 5 is a flowchart illustrating messaging operations performed by a system comprising a smartphone and a protective case with integrated wireless adaptor. The example steps begin with step 502 in which the case 100 is mounted to the handheld device 300. In step 504, information is exchanged, via bus 224a, connector 220, connector 310, and bus 312, between the case 100 and the device 300 to establish a connection between the device 300 and case 100. In step 506, a user of the device 300 launches a messaging application, creates a message to be sent to a another device (e.g., a device like the device 300 that is mounted to a case like the case 100) which may be reachable via some unique identifier (e.g., phone number, voice mail, IP address, etc.), and clicks "send." In step 508, the device 300 informs the case 100 of the message to be sent and the case 100 determines whether the other device can be reached via the radio 218. If so, then in step 512 the message is transmitted via the radio 218. If not, then in step 510 the message is transmitted via radio 308. In an example implementation, the message may be an SMS (short messaging service) or MMS (multimedia messaging service) message. Accordingly, when the other device is in range of the radio 218 the SMS or MMS message may be converted to a format suitable for the radio 218 and transmitted via the radio 218 rather than via a cellular transmitter of the device 300. In an example implementation, the radio 218 may be lower power and/or lower cost. Sending the message via the radio 218 may be lower cost because, for example, the frequencies over which the radio 218 communicates may not require a license in the location in which the message is being transmitted, and or the license required is less expensive than the cost to send an MMS or SMS message via a cellular carrier associated with the radio 308.

Figure 6:
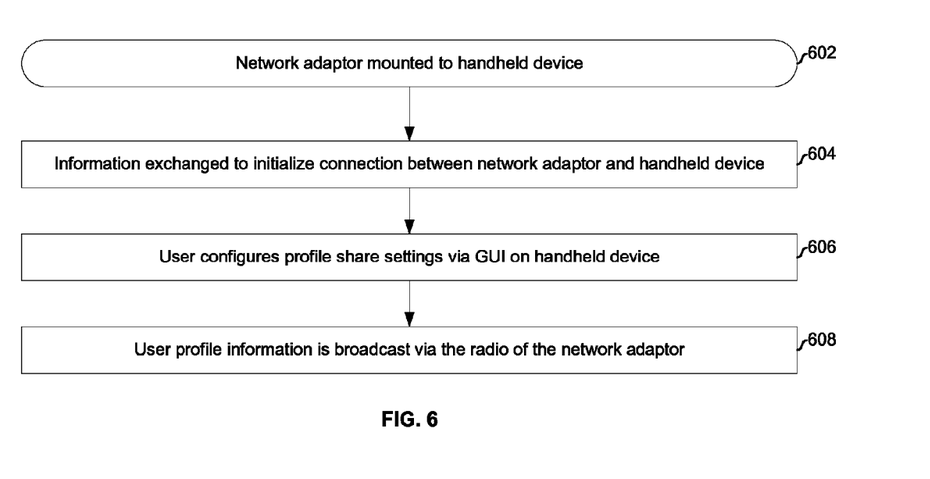
FIG. 6 is a flowchart illustrating social network operations performed by a system comprising a smartphone and a protective case with integrated wireless adaptor.

FIG. 6 is a flowchart illustrating social network operations performed by a system comprising a smartphone and a protective case with integrated wireless adaptor. The example steps begin with step 602 in which the case 100 is mounted to the handheld device 300. In step 604, information is exchanged, via bus 224a, connectors 220, connector 310, and bus 312, between the case 100 and the device 300 to establish a connection between the device 300 and case 100. In step 606, a user configures (e.g., via a graphical user interface (GUI) running on the device 300) profile information (e.g., the user's "likes" and "dislikes," the user's affiliations, products the user is using/carrying/wearing, the user's online URLs/handles/identifiers, etc.) that the user wishes to share with other that are in-range of the radio 218. In step 608, the device 300 may store the profile information to the memory 214 and the profile information may then be broadcast (e.g., periodically) via the radio 218.

Figure 7:
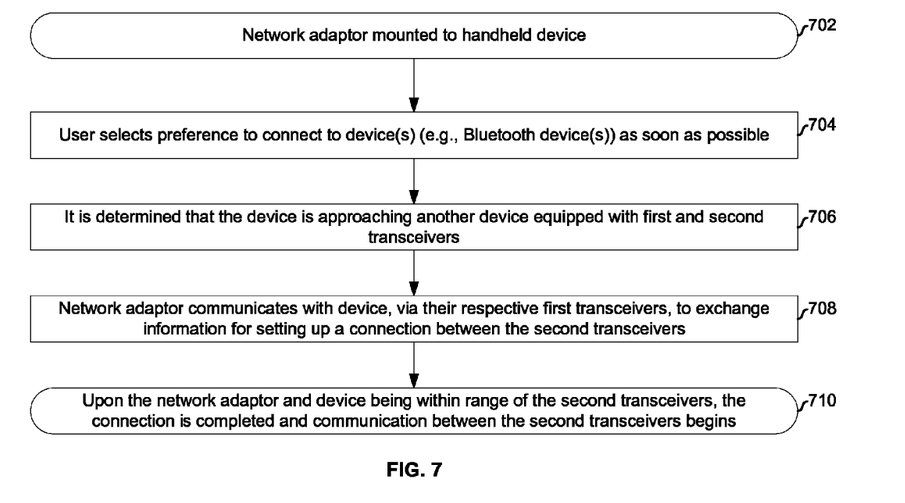
FIG. 7 is a flowchart illustrating connection initialization operations performed by a system comprising a smartphone and a protective case with integrated wireless adaptor.

FIG. 7 is a flowchart illustrating connection initialization operations performed by a system comprising a smartphone and a protective case with integrated wireless adaptor. The example steps begin with step 702 in which the case 100 is mounted to the handheld device 300. In describing the steps of FIG. 7, it is assumed that the radio 308 supports a first wireless protocol such as, for example, Bluetooth, which has a shorter range than the second wireless protocol(s) supported by the radio 218.

In step 704, information is exchanged, via bus 224a, connectors 220, connector 310, and bus 312, between the case 100 and the device 300 to establish a connection between the device 300 and case 100. In step 706, the case 100 determines (e.g., via transmission and/or reception of beacons, probes, and/or other messages via the radio 218) that the it and the device 300 mounted to it are approaching a another device which has one or more radios that support the first wireless protocol (e.g., Bluetooth) and the second wireless protocol (e.g., protocols described in U.S. patent application Ser. No. 13/267,640 ("Method and Apparatus for Adaptive Searching of Distributed Datasets") and Ser. No. 13/267,621 ("Method and Apparatus for Low-Power, Long-Range Networking"), which are incorporated herein by reference as set forth above.

In step 708, the case 100 communicates with the other device via the radio 218 to exchange information for setting up a connection between the radio 308 and the second device, in anticipation of the other device coming within range of the radio 308. In step 710, the other device becomes in-range of the radio 308 and the information exchanged in step 708 is utilized to quickly establish a connection between the radio 308 and the other device. In this manner, the radio 218 enables out-of-band setup (or at least partial setup) of a network connection between the radio 308 and the other device while the other device is out-of-range of the radio 308.

Figure 8:
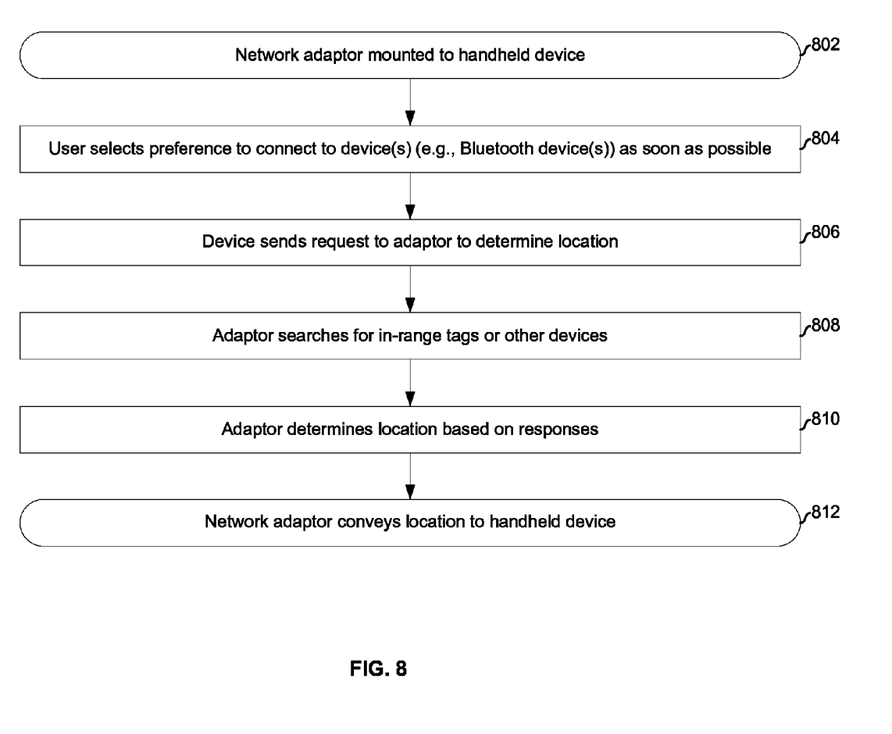
FIG. 8 is a flowchart illustrating determining location in a system comprising a smartphone and a protective case with integrated wireless adaptor.

FIG. 8 is a flowchart illustrating determining location in a system comprising a smartphone and a protective case with integrated wireless adaptor. The example steps begin with step 802 in which the case 100 is mounted to the handheld device 300. In step 804, information is exchanged, via bus 224a, connector 220, connector 310, and bus 312, between the case 100 and the device 300 to establish a connection between the device 300 and case 100. In step 806, the device 300 requests location information from the case 100. In step 808, the case 100 searches for tags (e.g., ISO 18000-7 compliant tags) and/or other devices which are in range of the radio 218. The search may, for example, be performed as described in U.S. patent application Ser. No. 13/267,640 ("Method and Apparatus for Adaptive Searching of Distributed Datasets"), which is incorporated herein by reference as set forth above. In step 810, the case 100 may determine its location based on responses received in step 808. For example, the case 100 may triangulate is location based on the number of responses received, the identity of devices or tags from which responses were received, and/or the timing with which the responses were received. The determination of location may comprise consulting a local and/or remote database which stores the location of tags and/or devices. In step 812 the case 100 may convey the determined location to the device 300.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for using a device case with integrated wireless adaptor.

Accordingly, the present method and/or apparatus may be realized in hardware, software, or a combination of hardware and software. The present method and/or apparatus may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or apparatus may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A system comprising:
a handheld electronic device that comprises a first radio operable to communicate in accordance with a first wireless communication protocol;
a protective case mounted to said handheld electronic device, wherein said protective case comprises a second radio that is operable to communicate in accordance with a second wireless communication protocol; and
wherein said system is operable to, in response to a detection that said system is approaching another device, exchange information with said other device via said second radio, and wherein:
said information is for establishing a wireless connection between said first radio and said other device; and
at least part of said information is exchanged while said other device is out-of-range of said first radio.

2. The system of claim 1, wherein said first radio is a Bluetooth radio.

3. The system of claim 1, wherein said system is operable to:
determine whether a destination device for which an MMS or SMS message is destined is within range of said second radio;
choose which of said first radio and said second radio to use for transmitting said MMS or SMS message based on said determination; and
transmit said MMS or SMS message via said chosen radio.

4. A method performed by a protective case that comprises a first radio and a first connector, the method comprising:
  receiving first data from said handheld electronic device via said first connector;
  transmitting said first data via said first radio;
  receiving, via said first radio, second data from another device; and
  communicating said second data to said handheld electronic device via said first connector; and
  wherein:
    said first data and said second data comprise information for setting up a connection between a radio of said handheld electronic device and said other device;
    said transmitting of said first data is in response to detecting that said case is approaching said other device; and
    said transmitting of said first data and receiving of said second data occur while said other device is out-of-range of said radio of said handheld electronic device.

5. The method of claim 4, comprising determining a location of said protective case based on said second data.

6. The method of claim 4, wherein said second data is received from one or more tags operable to communicate in accordance with ISO-18000-7 protocols.

7. The method of claim 4, comprising, prior to said transmitting said first data, processing said first data to make it suitable for transmission via said first radio.

8. The method of claim 7, wherein:
  said first data is received from said handheld electronic device in the form of an SMS or MMS message; and
  said first radio transmits said first data utilizing frequency spectrum that is unlicensed in the location in which said first radio performs said transmitting.

9. The method of claim 4, wherein said radio of said handheld electronic device is a Bluetooth radio.

10. A method performed by a protective case that comprises a first radio and a first connector, the method comprising:
  receiving first data from said handheld electronic device via said first connector;
  transmitting said first data via said first radio;
  receiving, via said first radio, second data from another device;
  communicating said second data to said handheld electronic device via said first connector; and
  prior to transmitting said first data, processing said first data to make it suitable for transmission via said first radio; wherein:
    said first data is received from said handheld electronic device in the form of an SMS or MMS message; and
    said first radio transmits said first data utilizing frequency spectrum that is unlicensed in the location in which said first radio performs said transmitting.

11. The method of claim 10, comprising determining a location of said protective case based on said second data.

12. The method of claim 10, wherein said second data is received from one or more tags operable to communicate in accordance with ISO-18000-7 protocols.

* * * * *